United States Patent Office 2,808,699
Patented Oct. 8, 1957

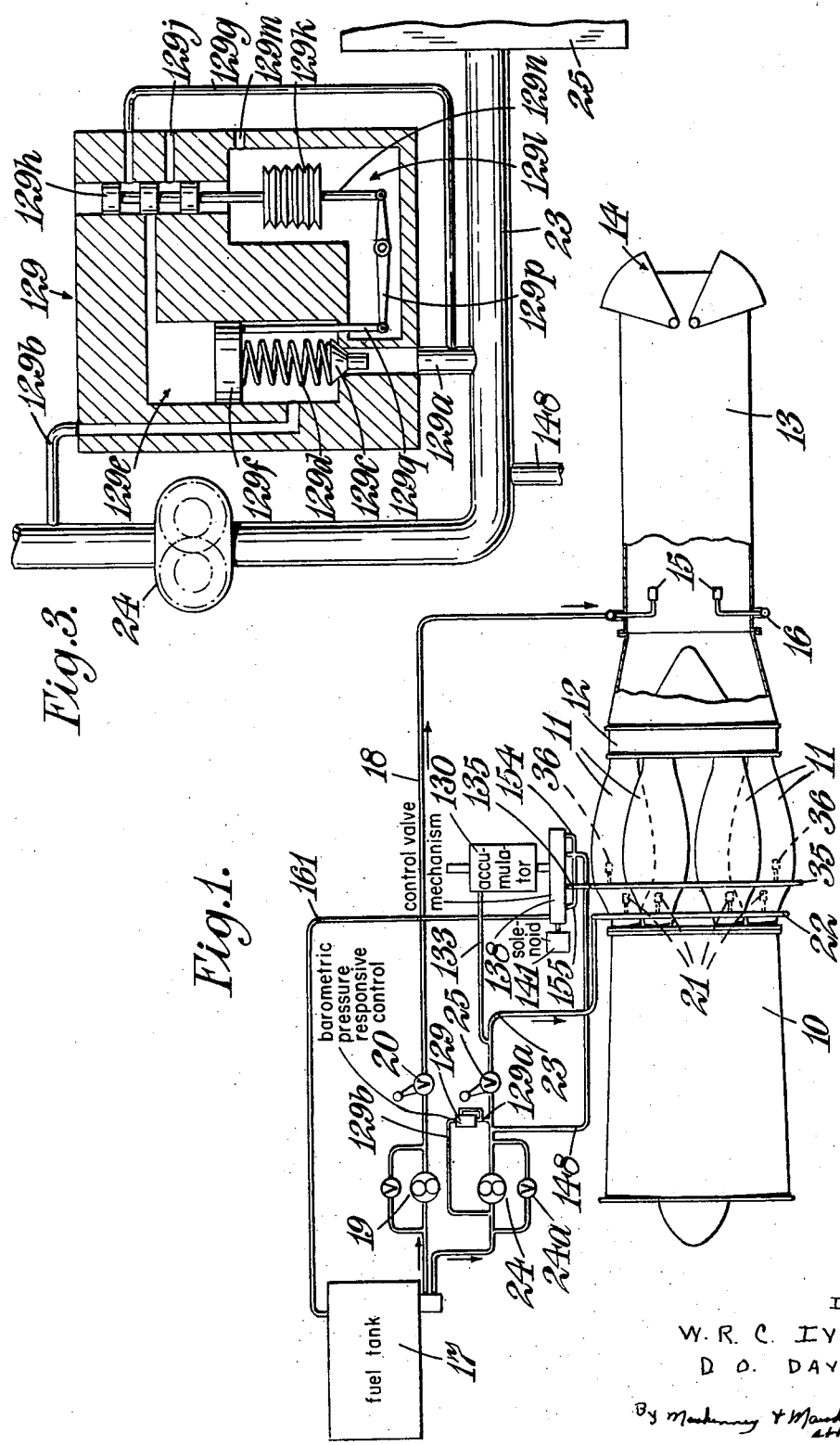

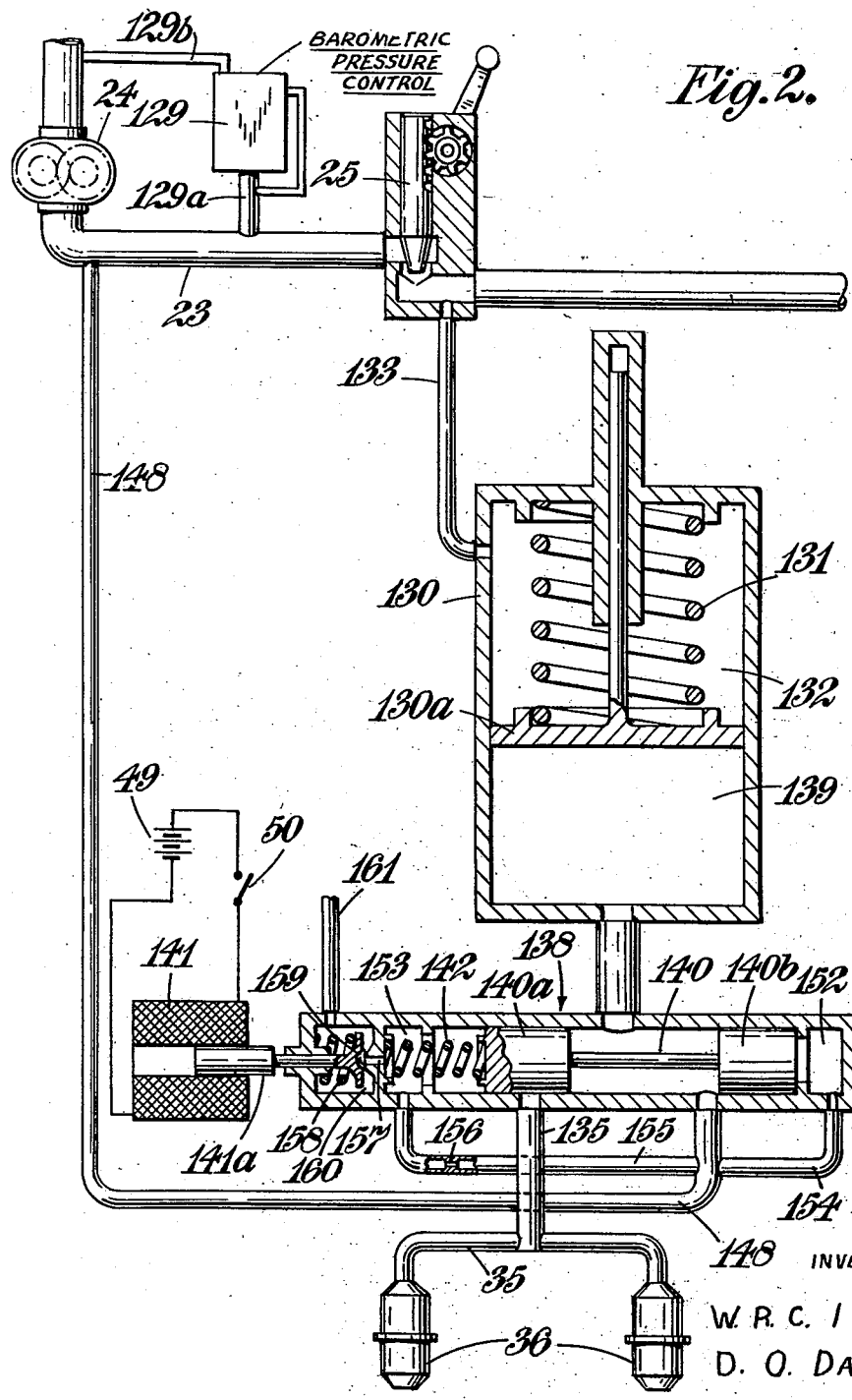

2,808,699

IGNITION SYSTEMS FOR ADDITIONAL COMBUSTION EQUIPMENT OF GAS TURBINE ENGINES

William Ralph Coleman Ivens, Derby, and David Omri Davies, Edgware, England, assignors to Rolls-Royce Limited, Derby, England, a British company Application November 3, 1950, Serial No. 193,826

Claims priority, application Great Britain November 9, 1949

3 Claims. (Cl. 60—35.6)

The invention relates to means for igniting fuel being supplied to additional combustion equipment of gas turbine engines for the purpose of initiating combustion in the additional combustion equipment; additional combustion equipment is provided for the purpose of reheating the working medium exhausting from a turbine system through which the working medium has passed, having previously been heated in main combustion equipment of the engine.

In one known arrangement, the combustion space of additional combustion equipment is afforded by the jet-pipe of an aircraft reaction propulsion gas turbine engine, fuel being burnt in the jet-pipe to reheat the exhaust gas from a turbine system prior to its discharge to atmosphere through a propelling nozzle on the end of the jet-pipe thereby to augment the propulsive thrust of the exhaust gas jet.

In another known arrangement, a compound gas turbine engine having a high pressure turbine system and a low-pressure turbine system, additional combustion equipment is provided to reheat the working medium between the turbine systems.

With gas turbine engines comprising additional combustion equipment, it is usual to initiate combustion of fuel being delivered to the additional combustion equipment only when the working medium is passing through the additional combustion equipment at high velocity, and difficulties have been experienced in obtaining satisfactory and reliable ignition in these circumstances; these difficulties are increased, when the gas turbine engine incorporating the additional combustion equipment is of the kind used for aircraft propulsion, due to the varying atmospheric conditions under which the engine is required to operate.

The invention has for an object to provide improved means for initiating combustion in the additional combustion equipment of gas turbine engines whereby the above difficulties are avoided.

It is another object of the invention to provide a novel construction of gas turbine engine which has a normal fuel supply system to supply fuel to main combustion equipment upstream of the turbine, a second fuel supply system to supply fuel downstream of the turbine when extra power is required, and a separate fuel system to supply a predetermined volumetrically metered quantity of additional fuel to the main combustion equipment separately from that supplied through the normal fuel supply system on occasions when it is required to ignite fuel supplied by the second fuel supply system.

The quantity of additional fuel should not be so great as to cause excessive temperature rise in a turbine and the time taken to inject the additional fuel should be limited. If either the quantity of additional fuel is too great or its time of injection is too long, excessive temperatures may occur in the turbine causing damage to the turbine blades.

Preferably, the predetermined volumetrically-metered quantity of additional fuel introduced into the main combustion equipment is varied in a predetermined manner as a function of the ambient atmospheric pressure under which the engine is running, and is introduced into the main combustion equipment over a period of time which is substantially constant irrespective of variations in an operating condition, such as atmospheric pressure, under which the engine is running.

In a preferred arrangement according to this invention, the volumetric-displacement device comprises a piston and cylinder or the equivalent arranged to have a fluid pressure applied therein to one side of the piston to effect discharge of the fuel from the other side of the piston, and to have connected thereto on said other side of the piston a fuel pressure source for charging of the device; valve means is provided to isolate the device from the fuel pressure source, when the volumetrically-metered charge is to be fed into the main combustion equipment. In such an arrangement, a resilient load, such as may be obtained from a spring having a defined rate, may be applied between the piston and cylinder to act in the same sense as the fluid pressure applied to said one side of the piston. The fluid pressure is arranged to have a predetermined relationship to the atmospheric pressure under which the engine is running; in addition, the charging fuel pressure has a predetermined relationship with the atmospheric pressure under which the engine is running whereby the quantity of fuel with which the device is charged, is dependent upon these conditions.

In such an arrangement the rate of discharge of the additional fuel is varied in accordance with variations of the fluid pressure which operates in conjunction with the resilient load.

An embodiment of means for effecting ignition of fuel being delivered to additional combustion equipment will now be described by way of example of the invention, reference being made in the description to the accompanying diagrammatic drawings in which:

Figure 1 illustrates a simple form of gas turbine engine suitable for the reaction propulsion of aircraft and arranged for reheating of the exhaust gases in the jet-pipe of the engine.

Figure 2 illustrates one form of apparatus according to this invention suitable for injecting the additional fuel into the main combustion equipment of a gas turbine engine.

Figure 3 illustrates a known construction of part of the fuel system illustrated in Figures 1 and 2.

Referring to Figure 1 of the drawings, the aircraft jet-propulsion gas turbine engine comprises a compressor system 10 drawing air from atmosphere and delivering it to main combustion equipment illustrated as a series of combustion chambers 11 in which fuel is burnt; the compressed air is thus heated and the heated air is delivered from the main combustion equipment 11 to a turbine system 12, which drives the compressor; the exhaust gas from the turbine system passes into exhaust ducting 13, at the exit end of which there is provided a propelling nozzle 14, illustrated as an adjustable nozzle. The normal fuel supply to the main combustion equipment 11 is effected through fuel injection devices 21 fed from a manifold 22 connected with a fuel tank 17 by a pipe 23 having located in it a fuel pressurizing pump 24 and a throttle 25. The discharge pressure of hte pump 24 may be controlled by varying the loading on a bypass relief valve 24a, by which fuel is bypassed to the suction side of the pump 24, or alternatively by the use of a variable-capacity pump.

The engine also comprises additional combustion equipment comprising means for supplying fuel to be burnt in the exhaust ducting 13 so that the exhaust gases from the turbine 12 are reheated prior to their discharge through the propelling nozzle 14; the fuel supply means comprise suitable fuel injection nozzles 15 fed from a manifold 16 connected with the fuel tank 17 through conduit 18 having arranged in it a fuel pump 19 and control valve 20.

Normally exhaust gas heating is effected to increase the thrust of the engine under maximum power conditions, and in order to avoid the occurrence of excessive temperatures in the turbine system 12 during exhaust heating it is usual to increase the area of the propelling nozzle 14. The adjustment of the area of nozzle 14 may be effected in any known or convenient manner.

The initiation of combustion of the fuel supplied to the additional combustion equipment by its injection nozzles 15 has to be effected while the exhaust gases are flowing through the exhaust duct 13 at a high velocity, and is effected according to the invention by temporarily introducing an excess of fuel into the main combustion equipment 11. It is thought that by introducing this excess of fuel a flame is produced in the main combustion equipment which extends through the turbine system 12 into the exhaust duct 13.

It will be appreciated that in normal operation of a gas turbine engine, fuel fed to the main combustion equipment 11 is completely burned before the gases reach the turbine system 12, and thus a flame will only exist to extend through the turbine if excess fuel is supplied.

The invention accordingly provides ignition apparatus for initiating combustion in the additional combustion equipment by introducing into the main combustion equipment 11 a predetermined, volumetrically-metered quantity of fuel which quantity of fuel is additional to the normal supply of fuel to the main combustion equipment.

The volume of this additional quantity of fuel is controlled to be a function of the atmospheric pressure under which the engine is running, so that at high altitude the actual volume discharged is less than at low altitude, and so that the time of discharge is substantially constant, thereby to avoid the possibility of damage to turbine blading due to prolonged heating by the ignition flame.

An arrangement whereby this can be effected is illustrated in Figure 2, and in this arrangement a piston and cylinder accumulator device 130 is provided which device comprises first and second cylinder spaces 132, 139 separated by the piston 130a, and a coil spring 131 loading the piston 130a. The cylinder space 132 is connected by a pipe 133 with the main fuel supply pipe 23 on the downstream side of the throttle valve 25 so that the spring load on the piston 130a is augmented by a load dependent on the fuel pressure downstream of the throttle valve 25. The fuel system comprises a control of the well known kind known as a "barometric pressure control" (indicated at 129) by which the pressure upstream of the throttle device 25 is controlled to be proportional to the atmospheric pressure, and it has been found that in such a system the pressure drop across the throttle device, for any given position of the latter, is mainly a function of the atmospheric pressure. The pressure drop and also the fuel flow decrease as the atmospheric pressure decreases. One well-known form of such barometric pressure control and its operation will be described hereinafter with reference to Figure 3 of the drawings.

The second cylinder space 139 of the piston and cylinder accumulator device 130 is connected through a control valve mechanism 138 and pipe 148 with the upstream side of the throttle valve 25. The control valve mechanism 138 is operated by a solenoid 141 so that the valve member 140 occupies one or other of the two positions according to whether the solenoid is energized or de-energized. In one of the positions of valve member 140 (the position illustrated) communication exists between the pipe 23 on the upstream side of the throttle valve 25 and the second cylinder space. In the second of the positions of valve member 140, the second cylinder space 139 is placed in communication through pipe 135 with manifold 35 leading to injectors 36 through which the additional quantity of fuel is injected into the main combustion equipment 11, and communication between the cylinder space 139 and pipe 148 is broken.

The operation of the device described above is as follows:

Assume that both cylinder spaces 132, 139 and associated fuel connections are charged with fuel, and that the control valve mechanism 138 of the piston and cylinder accumulator device 130 is in the position in which free communication exists between the second cylinder space 139 and the upstream side of the throttle valve 25. The piston 130a of the accumulator device 130 will then take a position in which the loads due to the pressure drop across throttle 25 and the spring 131 are balanced.

Since the fuel pressure loading on piston 130a is a function of the pressure drop across the throttle valve 25 and thus is a function of atmospheric pressure, and the load exerted by the spring 131 is proportional to its extent of compression, the extent of compression of the spring, and therefore the displacement of the piston 130a will be substantially a function of atmospheric pressure. It follows that the second cylinder space 139 is at all times charged with a volume of fuel dependent upon the atmospheric pressure.

On movement of the control valve member 140 to its second position, fuel is discharged from the second cylinder space 139 to the fuel manifold 35 and thus to the main combustion equipment 11 at a rate which is dependent upon the spring loading and also upon the value of the fuel pressure on the downstream side of the throttle valve 25 in the main fuel system, which is a function of the atmospheric pressure. Thus the rate of discharge of fuel from the second cylinder space 139 to the manifold 35 is also a function of the atmospheric pressure; and since the actual volume of fuel to be discharge is substantially proportional to atmospheric pressure, it can be arranged that the time of discharge is approximately constant and independent of atmospheric pressure.

A solenoid 141 is provided to displace the valve member 140, and controls the position of the member 140 through a servo mechanism. The valve member 140 is a piston valve having two operating lands 140a, 140b and is urged by spring 142 into the position shown.

The spaces 152, 153 at the ends of the valve body beyond the piston valve member 140 are placed in communication with pipe 148 by branches 154, 155 whereof the branch 155 contains a flow restrictor 156. The space 153 has a bleed orifice 157 controlled by a valve member 159 carried by the solenoid armature 141a and a spring 158 is provided to urge the valve member 159 to close orifice 157.

When the solenoid 141 is de-energized, the valve member 159 closes orifice 157, so that the pressures on the ends of the piston valve member 140 are equal and the latter is held by spring 142 in the position shown.

When the solenoid 141 is energized, the valve member 159 lifts allowing a bleed through orifice 157 into the chamber 160 to drain pipe 161. Due to the presence of flow restrictor 156, this bleed flow causes a fall in pressure in chamber 153 so that the valve member 140 moves into its second position.

In the described arrangement the piston and cylinder accumulator device described is used in conjunction with a main fuel system of the well-known kind in which a barometric flow control device is connected to be sensitive to the pressure drop across restricting means including a throttle and to maintain this pressure drop substantially proportional to atmospheric pressure, and connections are made to the first and second chamber of the accumulator device from the upstream and downstream sides of the restricting means in the fuel supply line to the main fuel injectors in a manner similar to that just described in relation to the throttle valve. With this arrangement similar characteristics as to capacity of charge and rate of discharge will be obtained as in the last described arrangement, and the volume of fuel delivered to the fuel injectors will be proportional to the atmospheric pressure under which the engine is running.

It will be appreciated that, when effecting ignition of fuel in additional combustion equipment by the passage of a flame through the turbine system of an engine, it is desirable that the quantity of additional fuel fed to the main combustion equipment for ignition purposes should be carefully controlled to avoid the possibility of overheating of the turbine blading as would occur if an excessive or prolonged supply of additional fuel were to be effected. The ignition means of this invention enable such overheating of the turbine blading to be avoided.

With certain fuel systems, in order to obtain reliable ignition of the fuel being injected into the additional combustion equipment it has been found desirable to commence injection of the fuel into the additional combustion equipment shortly before the additional fuel is injected into the main combustion equipment, so as to permit the fuel pressure in the fuel system associated with the additional combustion equipment to be built up before additional fuel is injected into the main combustion equipment.

Referring now to Figure 3, the well-known form of barometric pressure control 129 illustrated comprises a by-pass line 129a having an inlet in pipe line 23 and an outlet which is controlled by a relief valve 129c loaded by a compression spring 129d. The load of the spring 129d is determined by the position of a piston 129f. The piston 129f is loaded by servo pressure fluid acting in chamber 129e above the servo piston 129f. The servo pressure fluid is admitted to chamber 129e through a connection 129g from by-pass line 129a, when a servo fluid control valve 129h is moved downwards from its central position, and is released to drain through connection 129j when the valve 129h is moved upwards from this position. The valve 129h is moved by the deformations of a flexible barometric capsule 129k which is evacuated and acts as a pressure-sensitive device. The capsule 129k is in a chamber 129l which is kept at ambient atmospheric pressure through a vent 129m, and the bottom of the capsule 129k is held by a rod 129n which is mechanically movable through a lever 129p and push-rod 129q in accordance with movements of piston 129f. Fluid flowing past valve 129c returns to the inlet of pump 24 through pipe line 129b.

In operation of the device, a decrease of atmospheric pressure results in expansion of the capsule 129k, whereby valve 129h is raised connecting chamber 129e with the drain connection 129j so reducing the pressure in chamber 129e. Therefore the resilient load on valve 129c due to spring 129d, which controls the outlet flow through the by-pass line 129a, 129b to the inlet of the pump 24, decreases, so reducing the controlled value of the pressure in delivery pipe 23. Meanwhile piston 129f rises and the capsule 129k is consequently dropped, restoring valve 129h to its central position and cutting off the chamber 129e from the drain connection 129j. With increase of ambient pressure the converse action takes place. The connection 129g is supplied with servo fluid at constant pressure, and connection 129j may conveniently return the servo fluid to a reservoir (not shown).

We claim:

1. A gas turbine engine comprising main combustion equipment, a first fuel supply system connected to supply fuel under pressure to said main combustion equipment and including main fuel injectors in said main combustion equipment and a main fuel conduit through which fuel is supplied to said main fuel injectors, a turbine system connected to receive heated working medium from the main combustion equipment, additional combustion equipment arranged downstream of the turbine system to receive working medium exhausting from the turbine system, a second fuel supply system connected to supply fuel under pressure to said additional combustion equipment, and means for initiating combustion of the fuel supplied to the additional combustion equipment comprising an additional fuel injector in said main combustion equipment, a cylinder, a piston within the cylinder to divide it into a first cylinder space and a second cylinder space, a spring urging the piston in a direction to increase the volume of the first cylinder space, a metering valve in said main fuel conduit, a first connection from said first cylinder space to said main fuel conduit downstream of said metering valve, a second connection from said second cylinder space to said main fuel conduit upstream of said metering valve, a third connection from said second cylinder space to said additional fuel injector, and valve means in said second and third connections, said valve means in one position placing said second cylinder space in communication with the main fuel conduit upstream of the metering valve and preventing communication between said second cylinder space and said additional fuel injector and said valve means in another position cutting off communication between said second cylinder space and said main fuel conduit and placing said second cylinder space in communication with said additional fuel injector, and means to adjust said valve means between said two positions.

2. A gas turbine engine comprising main combustion equipment, a first fuel supply system connected to supply fuel to said main combustion equipment and comprising a throttle device, means to control the pressure drop across the throttle device so that it is a function of atmospheric pressure and main fuel injectors in said main combustion equipment, a turbine system connected to receive heated working medium from the main combustion equipment, additional combustion equipment arranged downstream of the turbine system to receive working medium exhausting from the turbine system, a second fuel system connected to supply fuel to said additional combustion equipment, and means for initiating combustion of the fuel supplied to the additional combustion equipment, which combustion-initiating means includes a volumetric displacement device arranged to be charged with a predetermined volume of fuel, comprising a cylinder, a piston movable in said cylinder and arranged to divide said cylinder into two cylinder spaces, a spring loading said piston to increase the volume of the first of said cylinder spaces, a connection from said first cylinder space to said first fuel supply system downstream of said throttle device, a connection from said second cylinder space to said first fuel supply system upstream of said throttle device, an additional fuel injector in said main combustion equipment, a connection from said second cylinder space to said additional fuel injector, and means to introduce the predetermined volume of fuel into the main combustion equipment additionally to the normal fuel supply comprising valve means in one position placing said second cylinder space in communication with the first fuel supply system upstream of the throttle device and preventing communication between said second cylinder space and said additional fuel injector and said valve means in another position cutting off communication between said second cylinder space and said first fuel system and placing said second cylinder space in communication with said additional fuel injector and means to adjust said valve means between said two positions.

3. A gas turbine engine comprising main combustion equipment, a first fuel supply system connected to supply fuel under pressure to said main combustion equipment and including main fuel injectors in said main combustion equipment, a turbine system connected to receive heated working medium from the main combustion equipment, additional combustion equipment arranged downstream of the turbine system to receive working medium exhausting from the turbine system, a second fuel supply system connected to supply fuel under pressure to said additional combustion equipment, an additional fuel injector in said main combustion equipment, a container divided into a first space and a second space by a movable member, resilient means urging said movable member in the sense to increase the volume of said first space, a first hydraulic connection to one of said fuel supply systems whereby said connection receives fuel under pressure, a second hydraulic connection to said additional fuel injector and valve means operable to place said second space alternatively in communication with said first and said second hydraulic connections, whereby on operation of said valve means to place said second space in communication with said first hydraulic connection, a predetermined volume of fuel is fed into said second space, and, on subsequent operation of said valve means to place said second space in communication with said second hydraulic connection, said predetermined volume of fuel is introduced into the main combustion equipment additionally to the normal fuel supply to initiate combustion of the fuel supplied to the additional combustion equipment, and further comprising pressure-responsive pressure control means connected to be responsive to ambient atmospheric pressure and connected to control the pressure in said first hydraulic connection to be a function of ambient atmospheric pressure.

References Cited in the file of this patent

UNITED STATES PATENTS

| | | |
|---|---|---|
| 2,274,573 | Ziegler | Feb. 24, 1942 |
| 2,279,546 | Ziegler | Apr. 14, 1942 |
| 2,479,777 | Price | Aug. 23, 1949 |
| 2,520,434 | Robson | Aug. 29, 1950 |
| 2,520,967 | Schmitt | Sept. 5, 1950 |
| 2,543,366 | Haworth et al. | Feb. 27, 1951 |
| 2,552,231 | Streid et al. | May 8, 1951 |
| 2,629,569 | Andrews | Feb. 24, 1953 |
| 2,640,316 | Neal | June 2, 1953 |

FOREIGN PATENTS

| | | |
|---|---|---|
| 614,341 | Great Britain | Dec. 14, 1948 |

OTHER REFERENCES

"de Havilland Jet Engines" by E. S. Mult, part II, January 1947, pages 45 and 46. (Copy in Division 18.)